US012589398B2

(12) United States Patent
Grieshop et al.

(10) Patent No.: US 12,589,398 B2
(45) Date of Patent: Mar. 31, 2026

(54) VALVE ASSEMBLY FOR AGRICULTURAL SPRAYING, RELATED APPARATUS, RELATED SYSTEMS, AND RELATED METHODS

(71) Applicant: BOARD OF TRUSTEES OF MICHIGAN STATE UNIVERSITY, East Lansing, MI (US)

(72) Inventors: Matthew James-Donovan Grieshop, Lansing, MI (US); Mark Allen Ledebuhr, Lansing, MI (US); Nicholas Charles Tipper, Saint Johns, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 733 days.

(21) Appl. No.: 18/004,296

(22) PCT Filed: Jul. 9, 2021

(86) PCT No.: PCT/US2021/041024
§ 371 (c)(1),
(2) Date: Jan. 4, 2023

(87) PCT Pub. No.: WO2022/011218
PCT Pub. Date: Jan. 13, 2022

(65) Prior Publication Data
US 2023/0249199 A1      Aug. 10, 2023

Related U.S. Application Data

(60) Provisional application No. 63/050,449, filed on Jul. 10, 2020.

(51) Int. Cl.
*B05B 1/16* (2006.01)
*A01M 7/00* (2006.01)
(Continued)

(52) U.S. Cl.
CPC ......... *B05B 1/1681* (2013.01); *A01M 7/0089* (2013.01); *B05B 12/04* (2013.01); *B05B 15/55* (2018.02)

(58) Field of Classification Search
CPC .... A01M 7/005–0096; Y10T 137/2012; Y10T 137/265; Y10T 137/2652;
(Continued)

(56) References Cited

U.S. PATENT DOCUMENTS

| 3,583,440 A | 6/1971 | Andersson |
| 4,530,465 A | 7/1985 | Gauchet et al. |
(Continued)

OTHER PUBLICATIONS

International Search Report and Written Opinion mailed Oct. 20, 2021; PCT App. No. PCT/US21/41024.

*Primary Examiner* — Arthur O. Hall
*Assistant Examiner* — Juan C Barrera
(74) *Attorney, Agent, or Firm* — MARSHALL, GERSTEIN & BORUN LLP

(57) ABSTRACT

Valve assembly for agricultural spraying, related apparatus, related systems, and related methods. In accordance with an example, a valve assembly for agricultural spraying, the valve assembly includes a top valve, a bottom valve, and a fluid conduit. The top valve includes an air inlet, an air outlet, a top liquid inlet, and a top liquid outlet. The top valve provides fluid communication therethrough in at least two states. The bottom valve includes a bottom liquid inlet, a bottom liquid outlet, a discharge outlet, and a drain outlet. The bottom valve provides fluid communication therethrough in at least three states. The fluid conduit in fluid communication with the top liquid outlet and the bottom liquid inlet. The top valve and the bottom valve are in fluid communication via the fluid conduit. When the top valve is in the first state, the bottom valve is in the second state.

22 Claims, 8 Drawing Sheets

(51) Int. Cl.
  *B05B 12/04* (2006.01)
  *B05B 15/55* (2018.01)
(58) Field of Classification Search
  CPC .......... Y10T 137/2655; Y10T 137/266; Y10T
        137/2663; Y10T 137/2668; Y10T
        137/267; Y10T 137/2673; Y10T
        137/2675; Y10T 137/2678; Y10T
        137/268; Y10T 137/2683; Y10T
      137/2693; Y10T 137/2695; G05D 7/0166;
        F16K 31/126; F16K 31/18; F16K 31/30;
        F16K 31/32; F16K 31/34; F16K 1/12;
        F16K 15/144; F16K 17/06; F16K 17/10;
        F16K 17/34; F16K 31/122; F16K 7/17;
        B05B 1/16–169; B05B 15/55; B05B
      12/04; B05B 1/3046; B05B 12/085; B05B
        12/087; B05B 1/1636; B05B 1/3013;
        B05B 1/326; B05B 1/3026; B05B 15/50;
      B05B 15/58; A01C 23/007; A01C 23/047;
            A01C 23/008; A01C 23/027
  USPC ................................... 239/550, 11, 159–170
  See application file for complete search history.

(56) References Cited

U.S. PATENT DOCUMENTS

| | | | |
|---|---|---|---|
| 6,142,181 A | 11/2000 | Schumacher | |
| 7,156,321 B2 * | 1/2007 | Wichmann .......... A01M 7/0092 | |
| | | | 239/DIG. 15 |
| 2008/0078843 A1 | 4/2008 | Wichmann et al. | |
| 2022/0234064 A1 * | 7/2022 | Bremer ................... B05B 12/08 | |
| 2022/0264865 A1 * | 8/2022 | Maurer ................ F16K 37/005 | |

* cited by examiner

VALVE ASSEMBLY FOR AGRICULTURAL SPRAYING, RELATED APPARATUS, RELATED SYSTEMS, AND RELATED METHODS

CROSS REFERENCE TO RELATED APPLICATION

This application is a 35 U.S.C. § 371 National Stage of International Patent Application No. PCT/US21/41024 filed Jul. 9, 2021, which itself claims the benefit of and priority to U.S. Provisional Patent Application No. 63/050,449, filed Jul. 10, 2020, the content of each of which is incorporated by reference herein in their entireties and for all purposes.

STATEMENT OF GOVERNMENT INTEREST

None.

FIELD OF THE DISCLOSURE

The disclosure relates to valve assembly for agricultural spraying, related apparatus, related systems, and related methods and, in particular, to spraying systems and related methods for delivering chemicals to orchards and/or vineyards.

BACKGROUND OF THE DISCLOSURE

Pesticide application is a critical yet costly and time consuming part of fruit production. It can represent 30-40% of the production costs of fruit, typically $1000-1500 per acre per year just for the action of applying the pesticides, not even considering the chemical cost. Timing and spray quality are critical; missing even one spray can reduce high value fresh pack apples to processing grade, a 60-80% loss in value. It is also one of the least desirable and potentially dangerous activities. Driving an orchard repeatedly, 20 times a year or more to apply sprays, causes appreciable damage to fruit and the orchard from impact with the tractor or sprayer, soil compaction, and damage to the drive rows in wet and muddy conditions. Sprayers require higher horsepower, higher cost tractors than other farm activities, and the productivity of each sprayer/tractor combination is a significant limiting factor to grower success.

Globally there are over 8.4 million acres of protected agriculture (PA). Intensification, which can increase yields per acre 300 to 500% with less water and nutrient, is the trend in both protected agriculture and open field, where high density orchard systems are spreading from apples to a wide range of crops. Fruits and perennial crops are increasing as a percentage, but the lack of a pesticide application system optimized for these newer cropping systems is a major limiting factor. When pesticide sprays are required in protected agriculture, they are primarily done manually or as a fumigation. These are problematic in the US due to the point source pollution and worker safety concerns of fumigation, the lack of labor, high cost, slow speed, and inconsistency of manual applications. If a tractor/sprayer is used, enormous losses of usable space, up to 20%, are suffered as drive middles for the sprayer. All applications in enclosed areas suffer from OSHA considerations of having humans applying pesticides in enclosed spaces. This has always been a problem and it is a major limiting factor in the profitability and growth of protected agriculture. Being able to spray without humans, effectively, in an automated overhead way could make 20% more land available across these cropping systems without adding a single acre.

Tree fruit producers often rely upon airblast ground sprayers and/or solid-set canopy delivery system (SSCDS) to deliver pesticides to their orchards to control insect and disease pests. Unfortunately, these sprayers are a relatively inefficient means of delivering pesticides to their target and these results in relatively large amounts of agrochemical waste.

One means for applying pesticides to orchards or vineyards includes a single line, 1-direction unit that sprays for a set time, returns, and sprays clean water to flush. This approach does not provide control of dosage as is wasteful of sprayed chemical.

Another means for applying pesticides to orchards or vineyards includes a "loop" spray delivery system in which spray is delivered through a loop of hose. Once the system is primed with spray liquid, it is pressurized and sprays for a certain time. Then the system is purged with air, and alternatively ran a second time with clean water, then purged again. This system provides improved dosing, but topography makes for variable pressure and dose by height, purged spray needs to be used somewhere or be wasted, and there is limited line/row length due to pressure drop.

Another means for applying pesticides to orchards or vineyards includes a canister system loop. Approximately every 8 feet a canister is added that captures a known volume of spray material. The loop is primed, filling all the canisters. The loop is then purged with low pressure air. Air pressure is then increased to open the nozzle checks and the dose is sprayed. A float ball in the canister closes the outlet and reduces air consumption. Another float valve in the canister allows air to escape during filling. 2-3 nozzles are attached to each canister. This allows spraying up and down hills as long as the pressure head does not exceed the opening pressure of the relief valve, but it still requires a loop and the excess volume to fill it, the canister is expensive and mechanically complicated, lots of air/liquid interaction could cause foaming which is difficult to separate, draining the tubes between the canister and the end nozzles where the pressure checks are is problematic, pressurizing the loop with air from both sides with air improves the pressure drop situation over long row lengths, and pressure checks at each nozzle are unreliable and problematic.

Accordingly, it would be desirable to reduce the amount of agrochemical waste when using sprayers.

SUMMARY

In accordance with a first example, a valve assembly for agricultural spraying includes a top valve, a bottom valve, and a fluid conduit. The top valve includes an air inlet, an air outlet, a top liquid inlet, and a top liquid outlet. The top valve provides fluid communication therethrough in at least two states such that: (1) in a first state of the top valve, the air inlet is in fluid communication with the air outlet, and the top liquid inlet is in fluid communication with the top liquid outlet; and (2) in a second state of the top valve, the air inlet, the air outlet, and the top liquid inlet are in fluid communication with each other. The bottom valve includes a bottom liquid inlet, a bottom liquid outlet, a discharge outlet, and a drain outlet. The bottom valve provides fluid communication therethrough in at least three states such that: (1) in a first state of the bottom valve, the bottom liquid inlet, the bottom liquid outlet, and the drain outlet are in fluid communication with each other (2) in a second state of the bottom valve, the bottom liquid inlet is in fluid communication with the bottom liquid outlet; and (3) in a third state of the bottom valve, the bottom liquid inlet, the bottom liquid outlet, and the discharge outlet are in fluid communication with each other. The fluid conduit is in fluid communication with the top liquid outlet and the bottom liquid inlet. The top valve and the bottom valve are in fluid communication via the fluid conduit. When the top valve is in the first state, the bottom valve is in the second state.

In accordance with a second example, a valve assembly for agricultural spraying, the valve assembly includes a top valve, a bottom valve, and a fluid conduit. The top valve includes an air inlet, an air outlet, a top liquid inlet, and a top liquid outlet. The top valve provides fluid communication therethrough in at least two states such that: (1) in a first state of the top valve, the air inlet is in fluid communication with the air outlet, and the top liquid inlet is in fluid communication with the top liquid outlet; and (2) in a second state of the top valve, the air inlet, the air outlet, and the top liquid inlet are in fluid communication with each other. The bottom valve includes a bottom liquid inlet, a bottom liquid outlet, and a discharge outlet. The bottom valve provides fluid communication therethrough in at least two states such that: (1) in a first state of the bottom valve, the bottom liquid inlet is in fluid communication with the bottom liquid outlet; and (2) in a second state of the bottom valve, the bottom liquid inlet, the bottom liquid outlet, and the discharge outlet are in fluid communication with each other. The fluid conduit is in fluid communication with the top liquid outlet and the bottom liquid inlet. The top valve and the bottom valve are in fluid communication via the fluid conduit. When the top valve is in the first state, the bottom valve is in the first state.

In further accordance with the foregoing first and/or second examples, an apparatus and/or method may further include any one or more of the following:

In accordance with one example, the top valve defines a top interior chamber in fluid communication with the air inlet, the air outlet, the top liquid inlet, and the top liquid outlet. The top valve further includes a buoyant float slidably engaged within the top interior chamber. Buoyant forces from liquid filling the valve assembly slide the buoyant float into a upper position such that the top valve is in the first state. Air pressure forces from air pressurizing the valve assembly via the air inlet counteract any buoyant forces and slide the buoyant float into a lower position such that the top valve is in the second state.

In accordance with another example, the bottom valve defines a bottom interior chamber in fluid communication with the bottom liquid inlet, the bottom liquid outlet, the discharge outlet, and the drain outlet. The bottom valve further includes a piston, a piston spring, and a reed valve. The piston is slidably engaged within the bottom interior chamber. The piston defines an exit orifice in fluid communication with the drain outlet. The piston spring compressively engages with the piston. The reed valve is positioned over the exit orifice of the piston. In the absence of applied pressure, the reed valve is open and the piston is in an upper position preventing outflow via the discharge outlet such that the bottom valve is in the first state. Under a low applied pressure, the reed valve is closed and the piston is in an upper position preventing outflow via the discharge outlet such that the bottom valve is in the second state. Under a high applied pressure, the reed valve is closed and the piston is in a lower position allowing outflow via the discharge outlet such that the bottom valve is in the third state.

In accordance with another example, the top interior chamber and the bottom interior chamber are free or substantially free from pooling zones in which liquid can accumulate after drainage of the valve assembly.

In accordance with another example, the valve assembly includes a discharge nozzle in fluid communication with the discharge outlet of the bottom valve.

In accordance with another example, the fluid conduit has a diameter of at least 10 mm.

In accordance with another example, at least one of the air inlet, the air outlet, the top liquid inlet, the top liquid outlet, the bottom liquid inlet, and the bottom liquid outlet includes a rotatable connection for a fluid flow line.

In accordance with another example, a valve set for agricultural spraying includes a plurality of n valve assemblies according to any of the variously disclosed examples in series, a plurality of n−1 spray tubes, a plurality of n−1 air tubes, an initial bottom valve, an initial spray tube, a final top valve, and a final spray tube. N is at least 2 for the valve assemblies. Each spray tube is in fluid communication with an upstream bottom liquid outlet and a downstream top liquid inlet. The upstream valve assembly and the downstream valve assembly are in fluid communication via the spray tube. Each air tube is in fluid communication with an upstream air outlet and a downstream air inlet. The upstream valve assembly and the downstream valve assembly are in fluid communication via the air tube. The initial spray tube is in fluid communication with an initial bottom liquid outlet of the initial bottom valve and the top liquid inlet of the first valve assembly. The initial bottom valve and the first valve assembly are in fluid communication via the initial spray tube. The final spray tube is in fluid communication with the bottom liquid outlet of the nth (or last) valve assembly and the top liquid inlet of the final top valve. The final valve assembly and the final top valve are in fluid communication via the final spray tube. When the top valves are each in the second state, the bottom valves are each in the third state.

In accordance with another example, the initial bottom valve includes a bottom liquid inlet, a bottom liquid outlet, a discharge outlet, and a drain outlet.

In accordance with another example, the bottom valve of each valve assembly and the initial bottom valve defines a bottom interior chamber in fluid communication with the bottom liquid inlet, the bottom liquid outlet, the discharge outlet, and the drain outlet. The bottom valve of each valve assembly and the initial bottom valve further includes: a piston slidably engaged within the bottom interior chamber, the piston defining an exit orifice in fluid communication with the drain outlet; a piston spring compressively engaged with the piston; and a reed valve positioned over the exit orifice of the piston. In the absence of applied pressure, the reed valve is open and the piston is in an upper position preventing outflow via the discharge outlet such that the bottom valve is in the first state. Under a low applied pressure, the reed valve is closed and the piston is in an upper position preventing outflow via the discharge outlet such that the bottom valve is in the second state. Under a high applied pressure, the reed valve is closed and the piston is in a lower position allowing outflow via the discharge outlet such that the bottom valve is in the third state.

In accordance with another example, the valve set includes a plug and the final top valve includes an air inlet, an air outlet, a top liquid inlet, and a top liquid outlet. The plug is disposed within the top liquid outlet of the top final valve.

In accordance with another example, the top valve of each valve assembly and the final top valve define a top interior chamber in fluid communication with the air inlet, the air outlet, the top liquid inlet, and the top liquid outlet. The top valve further includes a buoyant float slidably engaged within the top interior chamber. Buoyant forces from liquid filling the valve assembly slide the buoyant float into a upper position such that the top valve is in the first state. Air pressure forces from air pressurizing the valve assembly via the air inlet counteract any buoyant forces and slide the buoyant float into a lower position such that the top valve is in the second state.

In accordance with another example, the valve set includes a discharge nozzle in fluid communication with the discharge outlet of each bottom valve.

In accordance with another example, each discharge nozzle has a corresponding coverage area of spray liquid dispensed from the discharge nozzle and a ratio of (i) the collective internal volume of all spray tubes and all fluid conduits in the valve set to (ii) the collective coverage area of all discharge nozzles in the valve set is in a range of about 375 liter/hectare to about 935 liter/hectare.

In accordance with another example, the spray tubes and the air tubes are formed from a flexible plastic or rubber material.

In accordance with another example, a spray system for agricultural spraying includes a valve set according to any one of the examples disclosed. The spray system also includes a compressed air source, a liquid agrochemical formulation source, and a rinse liquid source. The compressed air source is in fluid communication with an air inlet or an air outlet. The liquid agrochemical formulation source is in fluid communication with the bottom liquid inlet of the initial bottom valve. The rinse liquid source in fluid communication with the bottom liquid inlet of the initial bottom valve.

In accordance with another example, the liquid agrochemical formulation includes a pesticide, a plant growth regulator, and/or a foliar nutrient in a water medium.

In accordance with another example, a valve set installation for agricultural spraying includes a valve set according to any examples disclosed mounted in an agricultural field includes agricultural plants thereon. The discharge outlets are positioned proximal to the agricultural plants such that spray liquid discharged via the discharge outlets contacts the agricultural plants.

In accordance with another example, a method for applying a liquid agrochemical formulation to agricultural plants includes providing the spray system according to any of the disclosed examples. The valve set is positioned in an agricultural field comprising agricultural plants thereon and the discharge outlets are positioned proximal to the agricultural plants such that spray liquid discharged via the discharge outlets contacts the agricultural plants. The method includes performing a liquid agrochemical formulation charging process with the top valves all in the first state and the bottom valves all in the second state. The charging process includes filling the internal volume of all spray tubes and all fluid conduits in the valve set with the liquid agrochemical formulation and performing a liquid agrochemical formulation charging process with the top valves all in the second state and the bottom valves all in the third state. The charging process includes pressurizing the air tubes and the top valves with the compressed air source to a pressure sufficient (i) to transition the top valves from the first state to the second state and (ii) to transition the bottom valves from the second state to the third state, thereby discharging the liquid agrochemical formulation from each fluid conduit and supply tube via the discharge outlet and onto the agricultural plants.

In accordance with another example, the method includes performing a rinse liquid charging process with the top valves all in the first state and the bottom valves all in the second state. The charging process includes filling the internal volume of all spray tubes and all fluid conduits in the valve set with the rinse liquid and performing a rinse liquid discharging process with the top valves all in the second state and the bottom valves all in the third state. The charging process includes pressurizing the air tubes and the top valves with the compressed air source to a pressure sufficient (i) to transition the top valves from the first state to the second state and (ii) to transition the bottom valves from the second state to the third state, thereby discharging the rinse liquid from each fluid conduit and supply tube via the discharge outlet and onto the agricultural plants.

In accordance with another example, the method includes opening the valve set to the atmosphere, thereby: (i) maintaining the top valves to the second state, (ii) transitioning the bottom valves to the first state, and (iii) allowing any liquid in the valve set to drain and exit the valve set via the drain outlets.

BRIEF DESCRIPTION OF THE DRAWINGS

For a more complete understanding of the disclosure, reference should be made to the following detailed description and accompanying drawings wherein.

DETAILED DESCRIPTION

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

The examples disclosed herein relate to solid-set canopy delivery systems (SSCDS) that drastically reduce the volume of pesticides and other sprays used in orchards, vineyards, and other crops. Generally, the system includes tubing that runs between and connects a series of valve assemblies that include microsprayers. The valve assemblies collectively define an internal volume between spray tubing and fluid conduits that that is designed to release a fixed amount of agrochemical and includes an upper valve that selectively isolates an air line and a feedline and a bottom valve that includes the microsprayers and a drain outlet. In practice, the internal volume is filled with the agrochemical, thereby causing a buoyant float within each valve assembly to rise and seal the air line from the feedline. After the internal volume is filled, a pressure within the air line overcomes a buoyant force on the buoyant float and the pressure urges the agrochemical (or other fluid) out of the bottom valve and the microsprayers in each valve assembly.

The valve assemblies, valve sets, and corresponding systems and methods provide several advantages when pesticides or other agrochemical to orchards, vineyards, or other agricultural settings. The various apparatus (1) have very high reliability (e.g., 5 years or more of reliable operation or more without service), (2) have high speed deployment and fast, tool free disassembly when service is needed, (3) eliminate the recirculating loop and restore 1-way flow, (4) reduce the air consumption vs. loop based systems, (5) completely drain the system after discharge, including lines out to the nozzles in the at-rest condition, to eliminate the risks of chemical residues or biofilm formations, (6) eliminate the individual nozzle check valves, (7) have component parts that are able to be inexpensively mass-produced from suitable environmentally stable materials, and (8) reduce heavy traffic/wear on the agricultural field from spraying vehicles.

Figure 1:
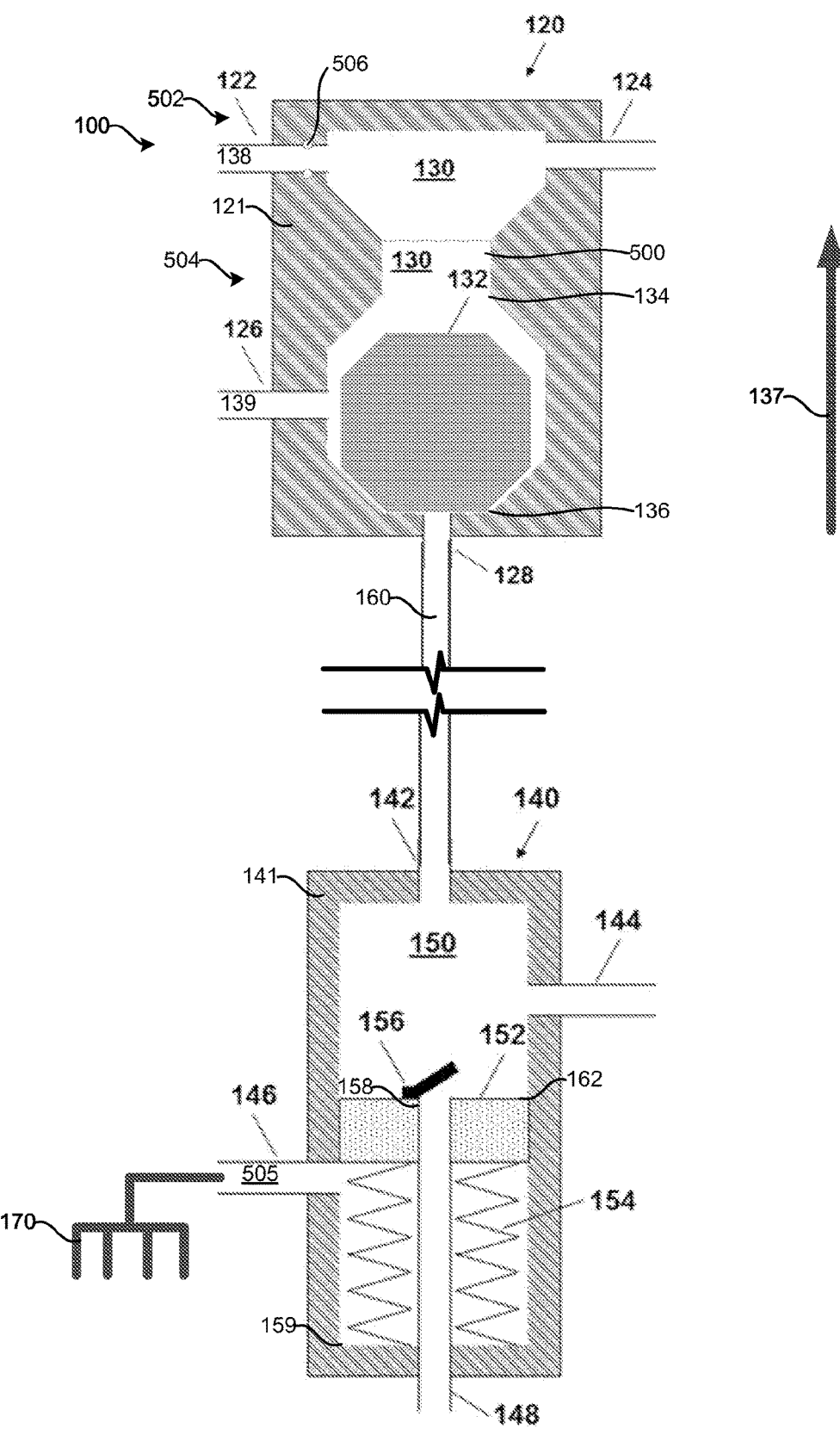
FIG. 1 is a valve assembly in accordance with a first example of the present disclosure with the top valve in the second state and the bottom valve in the first state.
Figure 2:
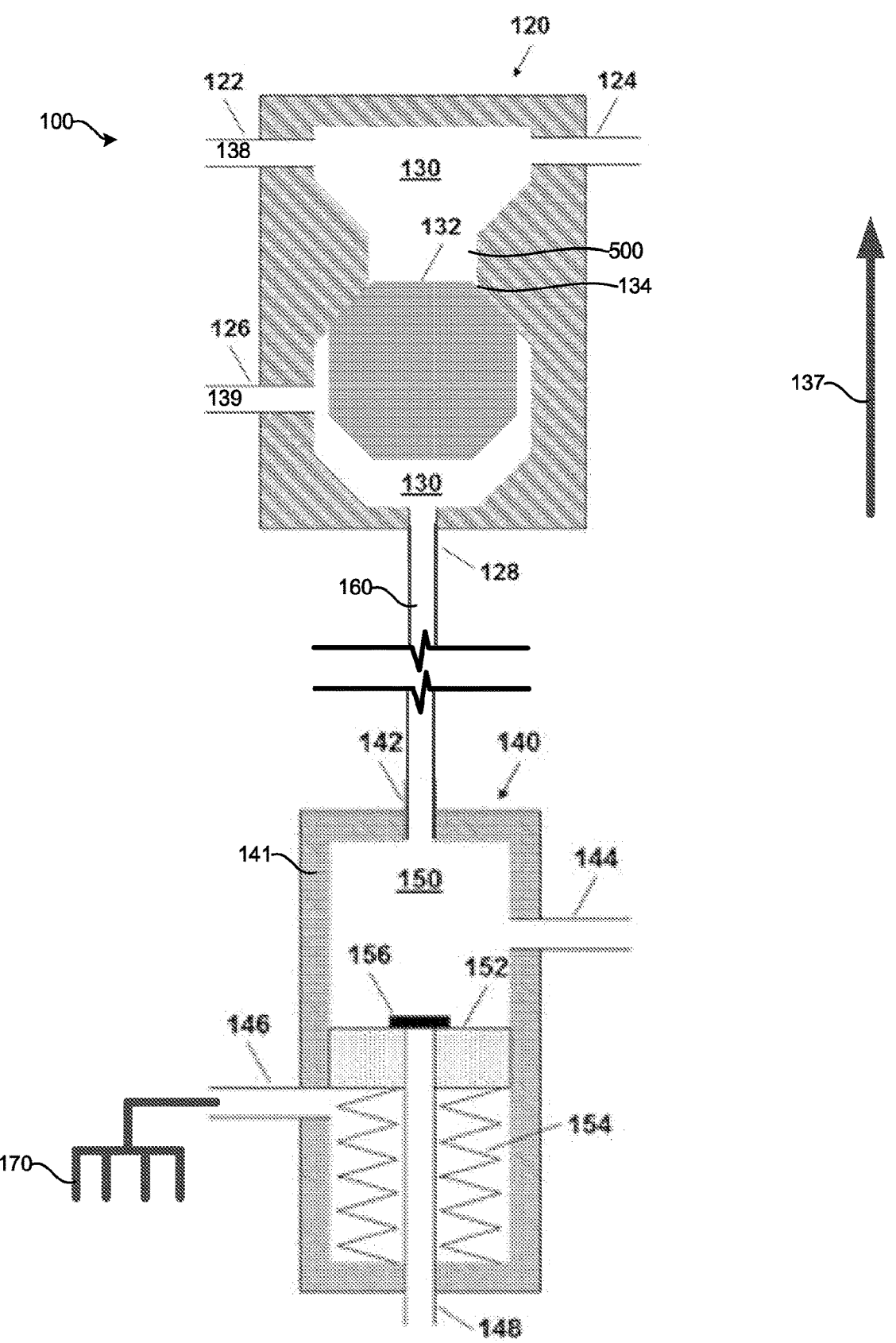
FIG. 2 is a cross-sectional schematic view of the valve assembly of FIG. 1 with the top valve in the first state and the bottom valve in the second state.
Figure 3:
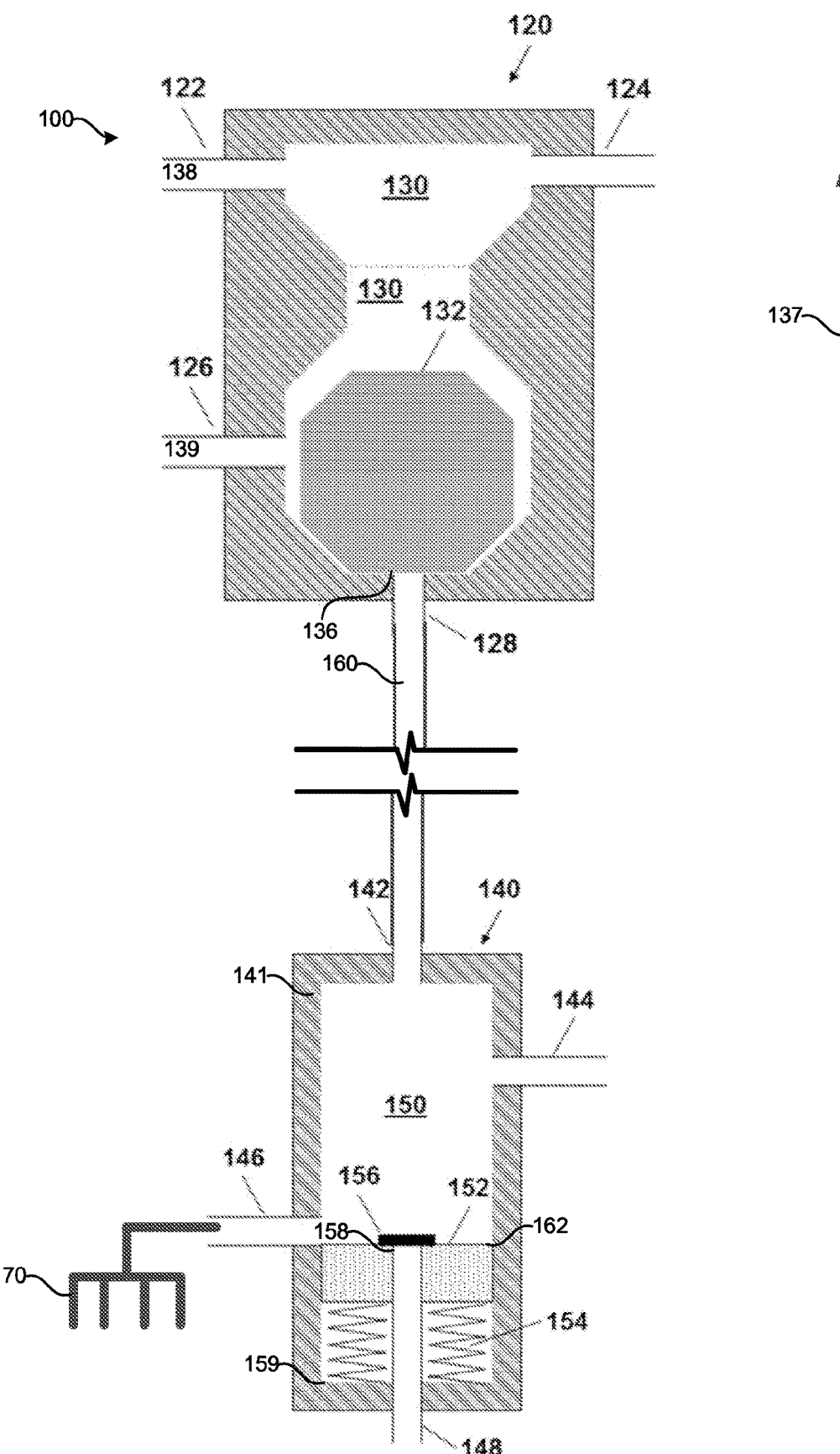
FIG. 3 is a cross-sectional schematic view of the valve assembly of FIG. 1 with the top valve in the second state and the bottom valve in the third state.

Referring now to the drawings, FIG. 1 is a valve assembly 100 in accordance with a first example of the present disclosure. FIGS. 2 and 3 are additional views of the valve assembly 100 in different states and/or positions. The valve assembly 100 may be used to dispense a fluid such as a chemical onto crops/agricultural produce and may be coupled in series with other valve assemblies 100 (see, for example, FIGS. 4 and 5) to produce a valve set 200. Some agricultural produce may be or be associated with trees in an orchard, vines in a vineyard, etc. Advantageously, the valve assembly 100 enables operators to more accurately determine an amount of chemical/pesticide to be used when dispensing the chemical/pesticide onto the crops/agricultural produce, thereby allowing for less chemical/pesticide waste.

In the implementation shown, the valve assembly 100 includes a top valve 120, a bottom valve 140, a fluid conduit 160, and a discharge nozzle 170. The fluid conduit 160 may be removably or permanently coupled between the top valve 120 and the bottom valve 140 and the discharge nozzle 170 may be coupled to the bottom valve 140.

The top valve 120 includes a top valve body 121 and includes an air inlet 122, an air outlet 124, a top liquid inlet 126, and a top liquid outlet 128. The top valve 120 provides fluid communication therethrough in at least two states. The top valve 120 may be a sliding valve and/or a three way valve having internal structure that is movable or otherwise selectable between at least two positions or conditions to permit fluid flow through the top valve 120 in at least two internal flow patterns.

The top valve 120 also includes a top interior chamber 130 in fluid communication with the air inlet 122, the air outlet 124, the top liquid inlet 126, and the top liquid outlet 128 and a buoyant float 132 slidably engaged within the top interior chamber 130. In some implementations, the top interior chamber 130 is free or substantially free from pooling zones in which liquid can accumulate after drainage of the valve assembly 100. The top valve body 121 includes opposing valve seats 134, 136 that are selectively engagable by the buoyant float 132 to control fluid flow through the top valve 120. The buoyant float 132 may be referred to as a valve plug or a buoyant plug. The inlets and outlets 122, 124, 126, 128 generally all access the top valve 120 internal volume defining the top interior chamber 130, but the top interior chamber 130 can be partitioned/segregated into non-fluid continuous portions by the buoyant float 132 in the different valve states or, more generally, based on the relative position of the buoyant float 132 and the valve seats 134, 136.

In a first state of the top valve 120 as shown FIG. 2, the air inlet 122 is in fluid communication with the air outlet 124 and both are not in fluid communication with the top liquid inlet 126 or top liquid outlet 128, and the top liquid inlet 126 is in fluid communication with the top liquid outlet 128 and both are not in fluid communication with the air inlet 122 or air outlet 124. The first state represents the upper position of the buoyant float 132 in which buoyant forces from liquid filling the valve assembly 100 causes the buoyant float 132 to move in a direction generally indicated by arrow 137 (e.g., also representing a vertical mounting direction or direction opposing gravity) and seal the against the valve seat 134 and a corresponding orifice 500 and seal an air line 138 from a liquid line 139, for example. The air line 138 can also be referred to as an air conduit. When the top valve 120 is in the first state, the valve assembly 100 may be charging/filling the valve assembly 100 with fluid (e.g., chemical I water) and/or during low pressure priming stages of operation.

In a second state of the top valve 120 as shown in FIGS. 1 and 3, the air inlet 122, the air outlet 124, and the top liquid inlet 126 are in fluid communication with each other and the top liquid outlet 128 is not in "substantial" fluid communication with any of the air inlet 122, the air outlet 124, or the top liquid inlet 126 such that (i) minor amounts of liquid might leak through the top liquid outlet 128, but, for example, in some implementations at least substantially 90, 95, 98, or 99% of all liquid in the top valve 120 exits via the top liquid inlet 126, and (ii) minor amounts of air can pass through the top liquid outlet 128 to equilibrate pressure in and allow liquid drainage from the flow conduit/standpipe 160. This second state of the top valve 120 represents the lower position of the buoyant float 132 in which pressure forces from the air inlet 122 and the air outlet 124 exceed the liquid buoyant forces acting on the buoyant float 132 to seal the top liquid outlet 128 from other inlet/outlet orifices 120, 124, 126. As an example, when pressure within the air line 128 and above the buoyant float 132 is at or above a pressure of about 2 bar (about 30 psig) and/or up to a pressure of about 4 bar or 6 bar (about 60 or 90 psig), a force acting on the buoyant float 132 in a direction generally opposite that indicated by arrow 137 overcomes the buoyant force of the liquid acting on the buoyant float 132, thereby causing the buoyant float 132 to move toward and sealingly engage against the lower valve seat 136. The second state of the top valve 120 is for the discharge stage of operation. The second state of the top valve 102 also represents the lower position of the buoyant float 132 in the absence of liquid and without applied pressure, such as for the drain stage of operation.

Referring to FIG. 2 and still to the top valve 120 and specifically to the buoyant float 132 and its relative position within the top valve body 121 and its interaction with the valve seats 134, 136, when the liquid fills the valve assembly 100 (e.g., water or water-based agrochemical formulation via the top liquid inlet 126) buoyant forces from the liquid filling the valve assembly 100 act on the buoyant float 132 and slide the buoyant float 132 into an upper position such that the top valve 120 is in the first state (e.g., in the absence of sufficient counteracting pressure in the air line) allowing the buoyant float 132 to seat against the upper valve seat 134. In some implementations, when the buoyant float 132 is moving toward the second state, the liquid pressure ranges between greater than 0 bar (0 psig) and up to about 1.35 bar (about 20 psig) causing the buoyant float 132 to rise with the liquid level to the degree that entrained air can separate and rise in the top interior chamber 130 and escape into the air line 138. When there is no more air in the liquid system such as within the top interior chamber 130, the buoyant float 132 rises and seals against the upper valve seat 134, thereby preventing or at least deterring ingress of liquid into the air line 138. The buoyant float 132 sealing against the upper valve seat 134 causes the liquid pressure to rise to a threshold pressure and/or a preset system pressure that is lower than the pressure used to fully open the bottom valve 140, typically about 1.35 bar (about 20 psig). However, other pressures may prove suitable to actuate the bottom valve 140.

In some implementations, the orifice 500 between an air system 502 and a liquid system 504 in the top valve 120 is smaller than an orifice 505 of the discharge outlet 146 of the bottom valve 140. The air system 502 is associated with the air line 138 and the liquid system 504 is associated with the liquid line 139. The relative sizing between orifices 500, 505 may cause a pressure drop in the liquid system 504 when the liquid in the liquid system 504 is exhausted and fully replaced with air. This pressure drop reduces the air pressure in the liquid system 504 to a range closer to a 2 bar (30 psig) cracking pressure of a piston 152 of the bottom valve 140, such that the bottom valve 140 remains open and/or partially. The piston 152 being in the partially open position advantageously reduces the consumption of compressed air.

Referring to FIG. 3, when an air pressure force within the air line 138 at the air inlet 122 and/or the air outlet 124 acting on the buoyant float 132 is greater than the buoyant forces, air pressure forces from air pressurizing the valve assembly 100 via the air inlet 122 counteract the buoyant forces and slide the buoyant float 132 into a lower position such that the top valve 120 is in the second state allowing the buoyant float 132 to seat against the lower valve seat 136. The second state of the top valve 120 is also the position that the top valve 120 is positioned in when draining the valve assembly 100 due to gravity for an open system.

Referring back to FIG. 1. in the implementation shown, the bottom valve 140 includes a bottom valve body 141 and includes a bottom liquid inlet 142, a bottom liquid outlet 144, a discharge outlet 146, and a drain outlet 148. The discharge nozzle 170 is in fluid communication with the discharge outlet 146 of the bottom valve 140. The bottom valve 140 may be a sliding valve and/or a four way valve having internal structure that is movable or otherwise selectable between at least three positions or conditions to permit fluid flow through the bottom valve 140 in at least three internal flow patterns. The bottom valve 140 provides fluid communication therethrough in at least three states.

In operation, the discharge nozzle 170 generally provides an atomized (micronized) droplet spray of the liquid discharged from the valve assembly 100, whether an agrochemical formulation/mixture/solution (e.g., pesticide, plant growth regulator, foliar nutrient, other agronomically beneficial material, etc.) or a water rinse. Such discharge nozzles 170 for agricultural spraying are generally known in the art.

Figure 6:
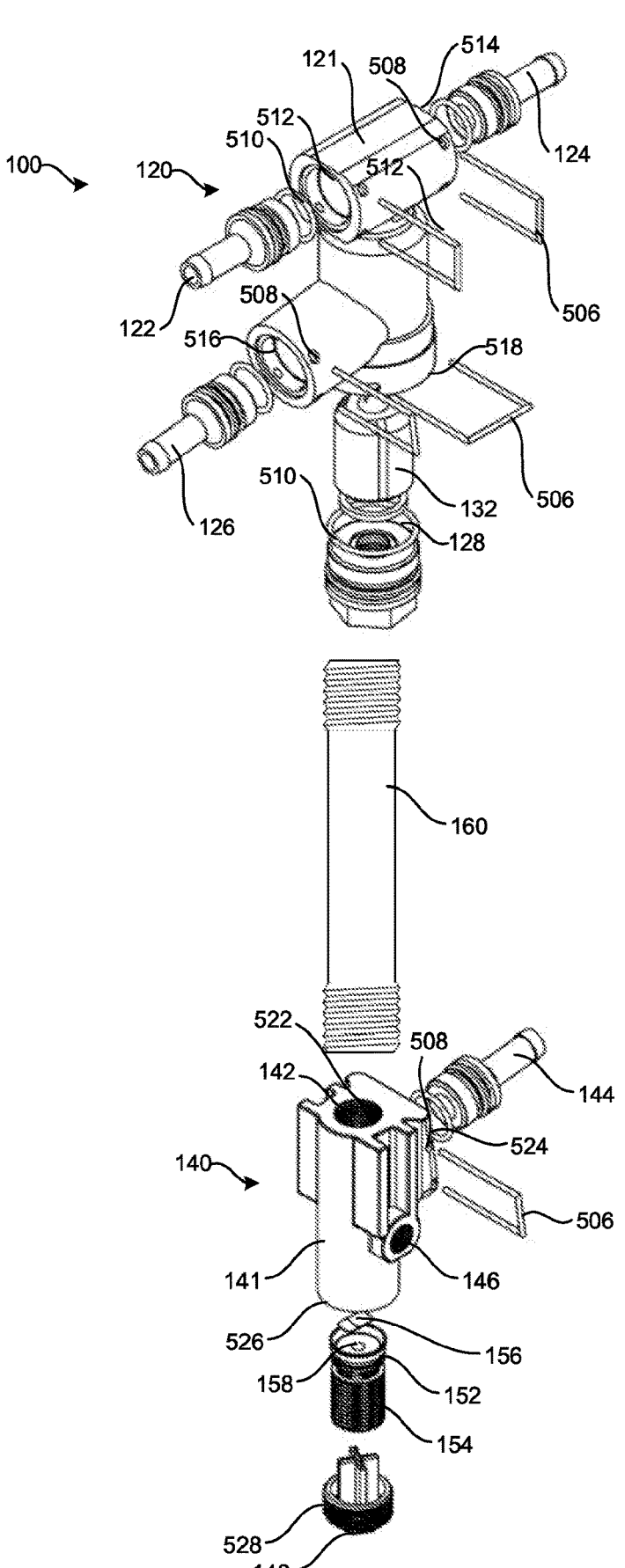
FIG. 6 is an expanded view of a valve assembly that can be used to the implement the valve assembly of FIG. 1 including the top valve, the bottom valve, and the fluid conduit.
Figure 7:
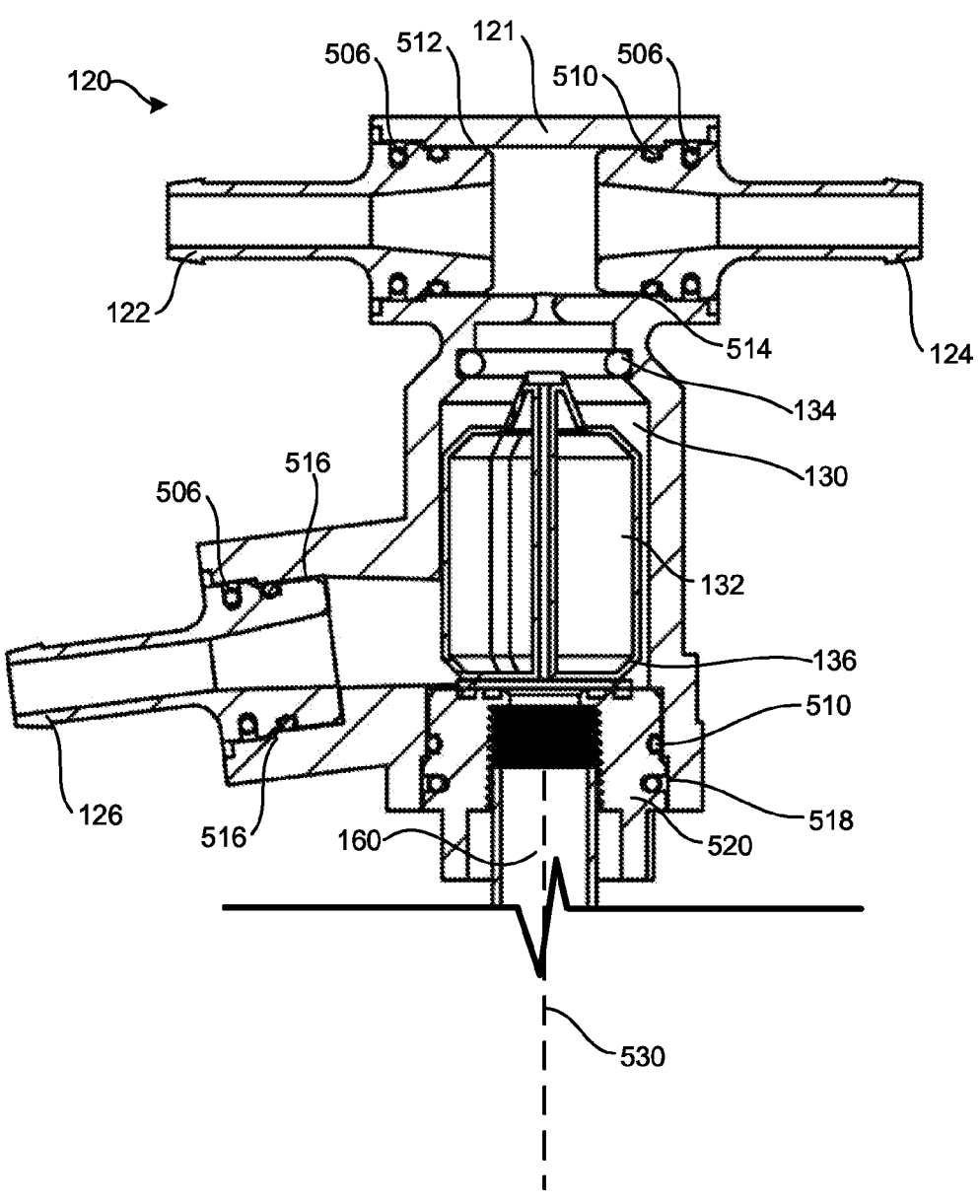
FIG. 7 is a partial cross-sectional view of the valve assembly of FIG. 6 showing the top valve and the fluid conduit.
Figure 8:
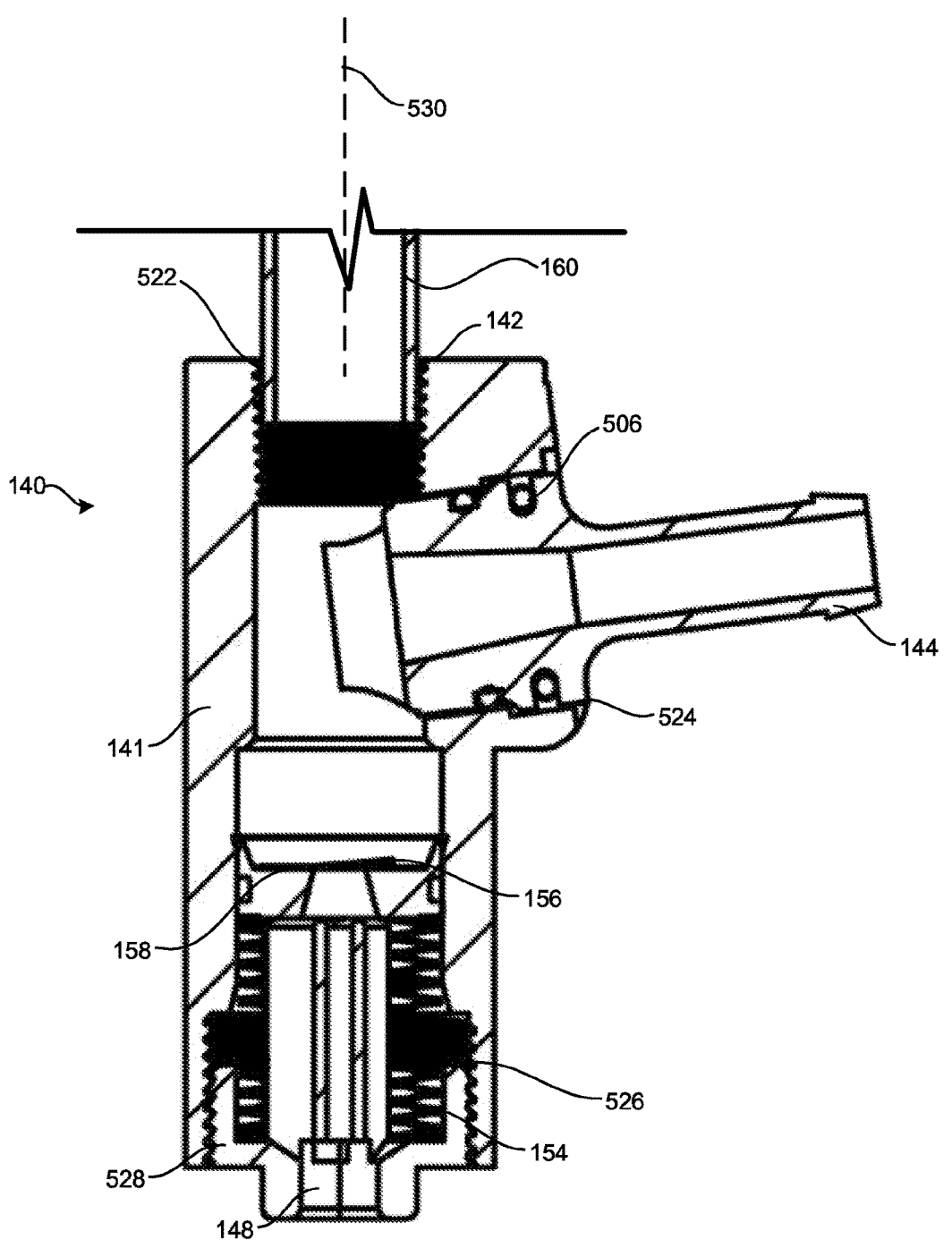
FIG. 8 is a partial cross-sectional view of the valve assembly of FIG. 6 showing the bottom valve and the fluid conduit.

In some implementations and more clearly shown in FIGS. 6, 7, and 8, at least one of the air inlet 122, the air outlet 124, the top liquid inlet 126, the top liquid outlet 128, the bottom liquid inlet 142, and the bottom liquid outlet 144 include a rotatable connection for a fluid flow line such as, for example, the air line 138 and/or the liquid line 139. Thus and more clearly shown in FIGS. 6, 7, and 8, the air inlet 122, the air outlet 124, the top liquid inlet 126, the top liquid outlet 128, the bottom liquid inlet 142, and/or the bottom liquid outlet 144 may be a separate component to the corresponding valve body 121, 141.

The air inlet 122, the air outlet 124, the top liquid inlet 126, the top liquid outlet 128, the bottom liquid inlet 142, and the bottom liquid outlet 144 may include a groove hose connection, a hose connection, a nipple, etc. that is rotatably coupled to the corresponding valve body 121, 141 by a fastener 506. The fastener 506 may be a clip, a pin, C-clip, bent wire, etc. The rotatable connection allows an (external) fluid flow line or conduit to be connected to the top valve 120 and/or the bottom valve 140 to permit gas and/or liquid flow into/out of/through the valve assembly 100, while the connected fluid flow lines (e.g., the air line 138, the liquid line 139) are able to rotate freely about at least one axis (i.e., while still maintaining a secure/sealed fluid flow connection). Such connections facilitate quick assembly (for installation) and/or disassembly (e.g., for maintenance or replacement of parts) of the valve assembly 100 and the valve set 200 further discussed below. Such connections also provide a degree of freedom that allows the valve assembly 100 and/or valve set components to bend, twist, or otherwise accommodate dimensional instabilities/changes of the various components resulting from extreme high and low environmental temperatures experienced during normal use in an extended-time (e.g., multiple years) outside installation. Such rotatable connections may be easily removed, but when installed reliably secure the connection to the valve.

The bottom valve 140 also defines a bottom interior chamber 150 in fluid communication with the bottom liquid inlet 142, the bottom liquid outlet 144, the discharge outlet 146, and the drain outlet 148 and includes the piston 152, a piston spring 154, and a reed valve 156. In some implementations, the bottom interior chamber 150 is free or substantially free from pooling zones in which liquid can accumulate after drainage of the valve assembly 100. Moreover, the interior walls of the top and bottom valves 120, 140 may be generally smooth, for example being free from sharp edges/corners (e.g., 90°) and/or recesses where particulate residues and/or liquid can accumulate or is otherwise unable to exit the valve assembly 100 via gravity during draining. Advantageously, allowing the top and bottom valves 120, 140 to be substantially or fully drained and/or opened to atmosphere enables liquid to be removed. Accumulation of liquid and any nonvolatile or suspended component of the liquid is undesirable: Accumulated agrochemical formulation can leave behind solid agrochemical residue upon evaporation/drying; accumulated water can create expansion problems upon freezing.

Referring still to the bottom valve 140, the piston 152 is slidably engaged within the bottom interior chamber 150 and defines an exit orifice 158 in fluid communication with the drain outlet 148. The piston spring 154 is compressively engaged with the piston 152 and an opposing wall 159 of the bottom interior chamber 150 or other surface of the bottom valve 140. The reed valve 156 is positioned over the exit orifice 158 of the piston 152 and attached to a top surface 162 of the piston 152 and covering the exit orifice 158 when in a closed configuration.

In a first state of the bottom valve 140 as shown in FIG. 1, the bottom liquid inlet 142, the bottom liquid outlet 144, and the drain outlet 148 are in fluid communication with each other such that the discharge outlet 146 is not in fluid communication with any of the bottom liquid inlet 142, the bottom liquid outlet 144, or the drain outlet 148. The first state of the bottom valve 140 represents the upper position of the piston 152 and an open position of the reed valve 156 under approximately zero applied pressure (or approximately atmospheric pressure) in which the reed valve 156 is open to the drain outlet 148 and the piston spring 154 maintains the piston 152 in an upper position that covers/seals the discharge outlet 146. The first state of the bottom valve 140 is for the draining stage of operation.

In a second state of the bottom valve 140 as shown in FIG. 2, the bottom liquid inlet 142 is in fluid communication with the bottom liquid outlet 144 such that the discharge outlet 146 and the drain outlet 148 are not in fluid communication with each other or any of the bottom liquid inlet 142 or the bottom liquid outlet 144. The second state of the bottom valve 140 represents the upper position of the piston 152 and a closed position of the reed valve 156 under low applied pressure (e.g., hydrostatic pressure from liquid in the fluid conduit 160) in which the reed valve 156 covers/seals the drain outlet 148 and the piston spring 154 maintains the piston 152 in an upper position that covers/seals the discharge outlet 146. The second state of the bottom valve 140 is for the charging/filling and low pressure priming stages of operation. The top valve 120 is in the first state, the bottom valve 140 is in the second state.

The position of the top and bottom valves 120, 140 reflects that the states of the top and bottom valve 120, 140 of the single valve assembly 100 are coupled during the charge/fill and low pressure stages of operation, because the liquid sealing the air line 138 via the buoyant float 132 also provides the hydrostatic pressure to close the reed valve 156 but not sufficiently compress the piston spring 154 (e.g., to move the piston 152 to allow fluid communication with the discharge outlet 146. During the discharge cycle of the valve set 200 discussed in more detail below in FIGS. 4 and 5, a coupling is provided between the top valve 120 in a given valve assembly 100 with the bottom valve 140 of the upstream valve assembly 100. Put another way, when the valve set 200 is discharging liquid, the top valve 120 of one valve assembly 100 is coupled to the bottom valve 140 of another valve assembly 100.

In a third state of the bottom valve 140 as shown in FIG. 3, the bottom liquid inlet 142, the bottom liquid outlet 144, and the discharge outlet 146 are in fluid communication with each other such that the drain outlet 148 is not in fluid communication with any of the bottom liquid inlet 142, the bottom liquid outlet 144, or the discharge outlet 146. The third state of the bottom valve 140 represents the lower position of the piston 152 and the closed position of the reed valve 156 under high applied pressure (e.g., air pressure of at least about 2 bar) in which the reed valve 156 covers/seals the drain outlet 148 and the piston spring 154 is compressed to a lower position that exposes the discharge outlet 146. This is for the discharge stage of operation that allows liquid to be dispended from the discharge nozzles 170. In various embodiments, discharge nozzles 170 may consist of hollow cone, rotary or impact plate type that operate in the range of 2.5 to 3.5 bar or 2 to 4 bar. Some discharge nozzles 170 that be used include nozzles used with solid set canopy delivery systems (SSDSS) that provide a Medium to Fine Droplet spectrum as defined by ASABE Standard S572.3. Some such discharge nozzles 170 may have a volumetric median diameter of under 250 microns. However, other sizes may prove suitable. The spray pattern of discharge nozzles 170 used with disclosed implementations may include radial; conical nozzles of varying cone angle. The mode of action of some nozzles used with the valve assembly 100 may be an impinging jet style or mechanically spinning nozzles typical to microsprinkler irrigation. High spraying performance has been observed in high density apples with impingement style nozzles optimized to create approximately a 130° cone at droplet spectra of approximately 200 VMD.

Referring still to the bottom valve 140 and specifically the reed valve 156 and its position to the top surface 162 of the piston 152, in the first state of the bottom valve 140 and as shown in FIG. 1, in the absence of applied pressure (e.g., when the valve assembly 100 is open to the atmosphere or at approximately atmospheric pressure), the reed valve 156 is open and the piston 152 is in an upper position preventing outflow via the discharge outlet 146 (e.g., substantially no piston spring 154 compression) such that the bottom valve 140 is in the first state.

In the second state of the bottom valve 140 and as shown in FIG. 2, under a low applied pressure (e.g., hydrostatic pressure from liquid in the fluid conduit 160), the reed valve 156 is closed and the piston 152 is in an upper position preventing outflow via the discharge outlet 146 (e.g., substantially no piston spring 154 compression or possibly minor spring compression) such that the bottom valve 140 is in the second state.

In the third state of the bottom valve 140 and as shown in FIG. 3, under a high applied pressure (e.g., pressurized air line of air pressure of at least about 2 bar), the reed valve 156 is closed and the piston 152 is in a lower position allowing outflow via the discharge outlet 146 (e.g., substantial piston spring 154 compression exposing the discharge outlet 146) such that the bottom valve 140 is in the third state.

In the implementation shown, the fluid conduit 160 (e.g., standpipe) is in fluid communication with the top liquid outlet 128 and the bottom liquid inlet 142 and the top valve 120 and the bottom valve 140 are in fluid communication via the fluid conduit 160 (e.g., the outlet/inlet 128, 142 pair thereof). The fluid conduit 160 may removable or permanently affixed to top and bottom valves 120, 140. The fluid conduit 160 may be free or substantially free from pooling zones, typically being in the form of an essentially straight/smooth standpipe, for example being substantially vertically aligned relative to gravity during normal operation. In some implementations, the fluid conduit 160 has a diameter (or hydraulic diameter for non-circular tubes) of at least 10 mm. More generally, the fluid conduit 160 can have any suitable diameter or hydraulic diameter that is large enough to limit or prevent substantial capillary action or retention within the tube. Such capillary action or retention would be undesirable, because it limits the ability of the fluid conduit 160 to efficiently drain during both discharge and rinse cycles, which in turn reduces the amount of agrochemical liquid delivered (i.e., material waste) and promotes the accumulation of agrochemical residue in the fluid conduit 160 upon drying (also undesirable). Diameters of at least about 10 mm limit or prevent substantial capillary action or retention of typical agrochemical formulations as well as rinse water, for example diameters of about 12.7 mm (½ inch) about 19.1 mm (¾ inch), or about 25.4 mm (1 inch). Larger diameters are possible, but are generally not needed in view of considerations such as cost, weight, delivery volume, etc. In various embodiments, the diameter can be at least 10, 12, 15, 20, or 25 mm and/or up to 15, 20, 25, 30, 40, or 50 mm.

FIG. 2 is a cross-sectional schematic view of the valve assembly 100 of FIG. 1 with the top valve 120 in the first state and the bottom valve 140 in the second state.

FIG. 3 is a cross-sectional schematic view of the valve assembly 100 of FIG. 1 with the top valve 120 in the second state and the bottom valve 140 in the third state.

Figure 4:
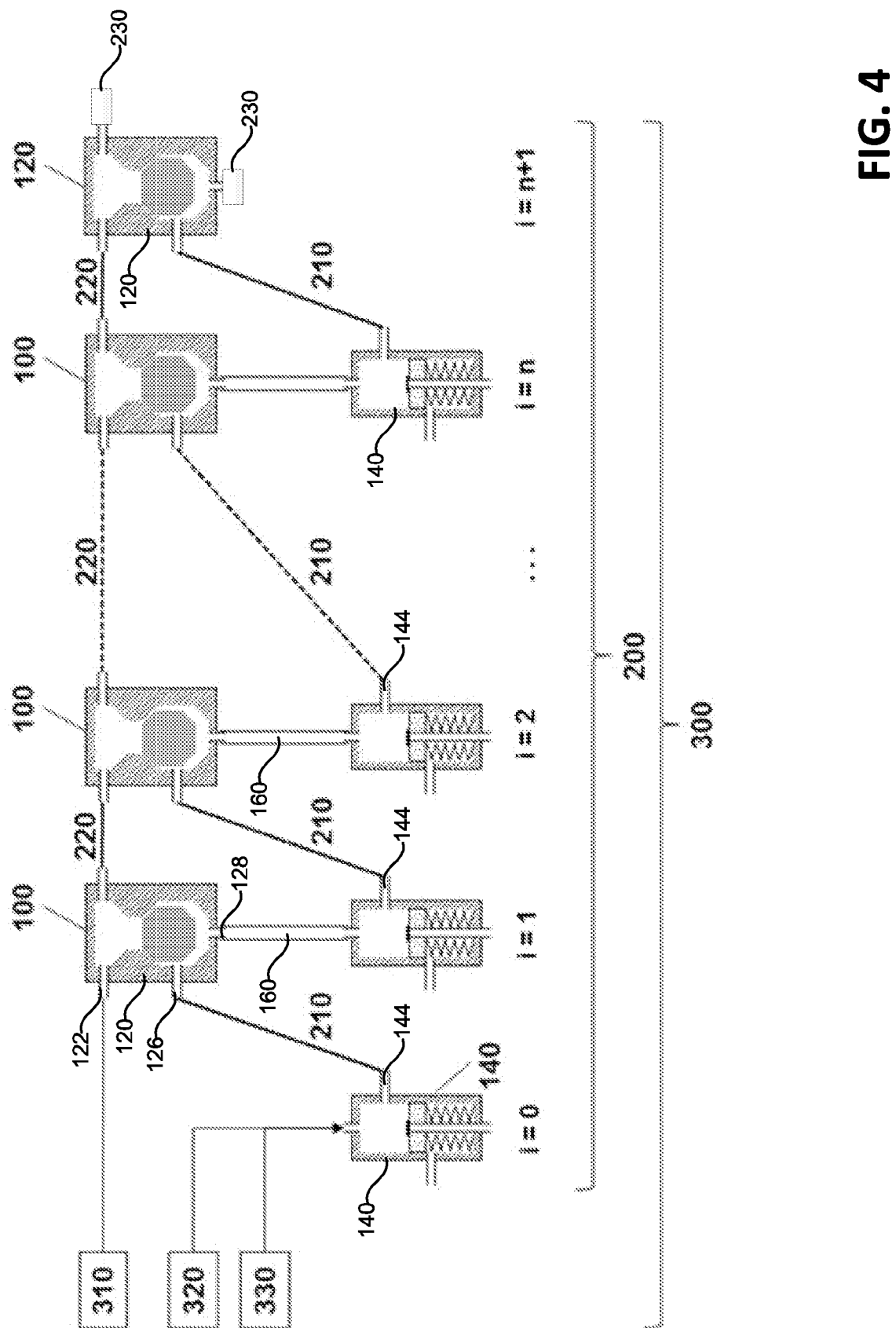
FIG. 4 is a cross-sectional view of a valve set for agricultural spraying and a spray system.

FIG. 4 is a cross-sectional view of the valve set 200 for agricultural spraying and a spray system 300. The valve set 200 includes a plurality of n valve assemblies 100 in series, a plurality of n–1 spray tubes 210, a plurality of n–1 air tubes 220, an initial bottom valve 140, an initial spray tube 210, a final top valve 120, and a final spray tube 210. N is at least 2 for the valve assemblies 100 and, in some implementations, may be approximately one hundred and sixty valve assemblies 100 (e.g., index i ranges from 1 to n complete valve assemblies in series). However, any number of valve assemblies (e.g., 2, 99, 200) may be included with the valve set 200, such as at least 2, 5, 10, 20, 40, 60, 80, 100 or 120 and/or up to 20, 50, 100, 120, 150, 180, 240, or 300 valve assemblies per valve set. For example, in some embodiments, n can be selected such that there are about 800 to 2200 valve assemblies per hectare, one valve assembly per 3-6 meters of linear row.

In the implementation shown, the top valves 120 are in the first state and the bottom valves 140 are in the second state. The spray tubes 210 and the air tubes 220 may be formed from any suitable material, for example a thermoplastic material, a flexible plastic (e.g., polyvinyl chloride (PVC)) and/or a rubber material. The stray tubes 210 and/or the air tubes 220 may have the same/similar diameters as described for the fluid conduit 160, for example to similarly limit liquid capillary action or retention in the spray tubes 210. Their flexible nature also accommodates dimensional instabilities/changes due to environmental variations, similar to the rotatable connection described above.

In the implementation shown, each spray tube 210 is in fluid communication with an upstream bottom liquid outlet 144 and a downstream top liquid inlet 126 and each air tube 220 is in fluid communication with an upstream air outlet 124 and a downstream air inlet 122. The upstream valve assembly 100 and the downstream valve assembly 100 are in fluid communication via the spray tube 210 including the initial bottom valve 140 being in fluid communication with the first valve assembly 100 via the initial spray tube 210 and the final valve assembly 100 being in fluid communication with the final top valve 120 via the final spray tube 210.

As shown, the bottom liquid outlet 144 of the first valve assembly 100 is in series and connected via the first spray tube 210 to the top liquid inlet 126 of the second valve assembly 100 in series, the bottom liquid outlet 144 of the second valve assembly 100 in series is connected via the second spray tube 210 to the top liquid inlet 126 of the third valve assembly 100 in series, the bottom liquid outlet 144 of the (n–1)th valve assembly 100 in series is connected via the (n–1)th spray tube 210 to the top liquid inlet 126 of the nth valve assembly 100 in series). Additionally, as shown, the upstream valve assembly 100 and the downstream valve assembly 100 are in fluid (e.g., gaseous only) communication via the air tube 220.

As used herein, "upstream" and "downstream" are relative terms that generally denote the direction of liquid flow through the valve set 200 during the charging stage. The same relative terms apply during other stages, even though liquid flow is partially reversed during the discharge stage (i.e., same forward flow in the standpipes, but reverse flow in the spray tubes 210). Thus, the valve assembly 100 index sequence 0 (initial bottom valve 140), 1 (first valve assembly 100), 2 (second valve assembly 100), 3, . . . n–1, n (last valve assembly 100), n+1 (final top valve) are in upstream-to-downstream order in the valve set 200 series arrangement, regardless of the particular stage or flow direction. "Upstream" can also represent the relative position in the valve set 200 at which liquid is fed to the valve set 200 during charging, whether for a liquid agrochemical formulation or a rinse liquid. Additionally, in some examples, a plug 230 is disposed within the final top liquid outlet 128 and another plug is disposed within the final air outlet 124.

Figure 5:
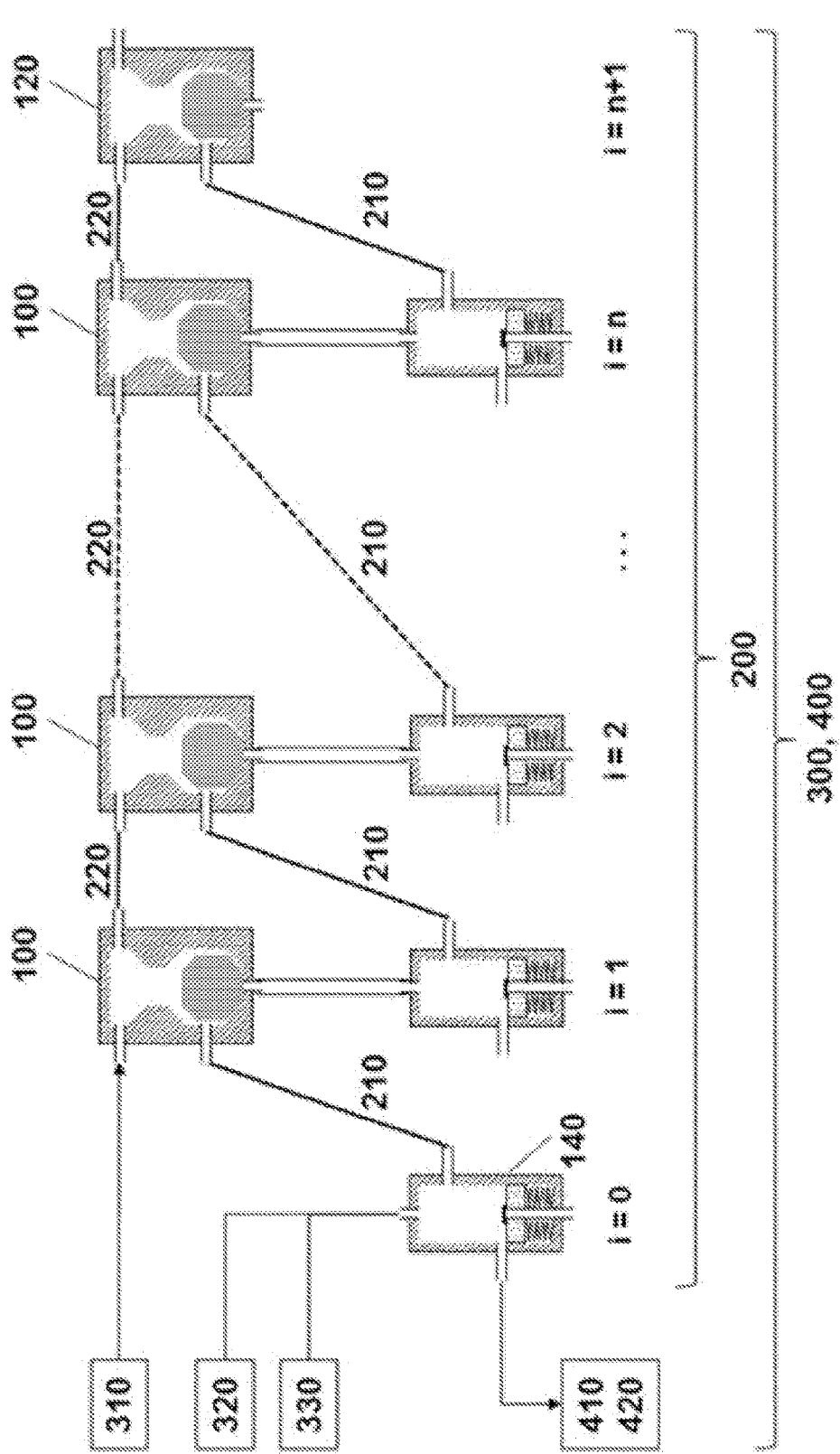
FIG. 5 is a cross-sectional view of the valve set of FIG. 4 and the spray system for agricultural spraying of FIG. 4 with the top valves in the second state and the bottom valves in the third state and showing a valve set installation and an agricultural field including agricultural plants thereon.

As shown in FIG. 5, when the top valves 120 are each in the second state, the bottom valves 140 are each in the third state. More specifically, application of sufficient pressure to place a given top valve 120 in the second state in turn provides sufficient pressure via the corresponding spray tube 210 to the immediately upstream bottom valve 140 to place that bottom valve 140 in the third state. The top valves 120 in the second state and the bottom valves 140 in the third state is the configuration of the valves 120, 140 during discharge.

In the discharge position, the discharge nozzles 170 receive the liquid and provide a corresponding coverage area of spray liquid dispensed from the discharge nozzle 170 (e.g., based on a selected reference discharge pressure, such as 2, 3, or 4 bar and a ratio of (i) the collective internal volume of all spray tubes 210 and all fluid conduits 160 in the valve set 200 to (ii) the collective coverage area of all the discharge nozzles 170 in the valve set 200 is in a range of about 375 liter/hectare to about 935 liter/hectare based on general range of about 40-100 gallons/acre, or more generally at least about 200, 300, 400, or 600 liter/hectare and/or up to about 500, 700, 1000, or 1200 liter/hectare. However, the valve assemblies 100 and/or the discharge nozzles 170 may be configured to spray any amount of liquid over any amount of area depending on, for example, the pressure applied, the amount of liquid housed within the fluid conduit 160, etc. Similarly, the intrinsic application rate of a given valve set could be increased in whole number multiples (e.g., based on serial applications of liquid) if desired to achieve a selected application rate. During draining and in the absence of applied pressure and as shown in FIG. 1, the top valves 120 are each in the second state and the bottom valves 140 are each in the first state.

Referring back to FIG. 4, FIG. 4 also illustrates the spray system 300 for agricultural spraying including the valve set 200, a compressed air source 310, a liquid agrochemical formulation source 320, and a rinse liquid source 330. In the implementation shown, the compressed air source 310 (e.g., an air compressor or bulk cylinders of compressed air) is in fluid communication with the air inlet 122 of the first valve assembly 100 or the air outlet 124 of the final top valve 120. While the compressed air is shown being delivered at the same relative location as the liquid delivery, the compressed air 138, 220 can be provided to the air line at any suitable location.

The liquid agrochemical formulation source 320 is in fluid communication with the bottom liquid inlet 142 of the initial bottom valve 140 and the rinse liquid source 330 is in fluid communication with the bottom liquid inlet 142 of the initial bottom valve 140. While the sources 320, 330 are shown delivering the liquid at the same relative location, the sources 320 and/or 330 can be provided to one of the bottom valves 140 at any suitable location including, for example, one of the bottom valves 140 in the middle of the valve set 200, thereby enabling flow through the valve set 200 in either direction and reducing cycle times of the valve set 200 by approximately half. Similarly, the liquids can be delivered to other points along the liquid flow path of the valve set 200, for example the liquid outlet of the final top valve (i.e., essentially reverse liquid flow of the illustrated operation), at an intermediate bottom valve or top valve between the initial bottom valve and final top valve, etc.

The liquid agrochemical formulation source 320 may be a spray tank or reservoir containing liquid agrochemical formulation and a corresponding pump for delivery to the valve set 200 and the rinse liquid source 330 may be a spray tank or reservoir containing a rinse liquid such as water and a corresponding pump for delivery to the valve set 200.

The liquid agrochemical formulation source 320 may contain a chemical and/or a liquid agrochemical formulation that includes a pesticide in a water medium, a pesticide including fungicide, insecticide, and miticides, avian and mammalian repellents, fertilizers, nutrients, biological pesticides such as fungi, bacteria, and their extracts, bio-rationals (stimulate the plants own defense system), and plant growth regulators including thinning chemicals and products that promote ripening or delays in ripening. Put another way, the liquid agrochemical formulation may be any liquid used in agricultural applications. The rinse liquid source 330 may contain water.

In some implementations, a valve can be used to switch between delivery of the liquid agrochemical formulation and the rinse liquid to the valve set 200 during appropriate charging/delivery stages and rinse stages of operation. A single pump can be used to alternatively deliver each liquid, or each liquid source 320, 330 can have its own dedicated pump. The air source and liquid sources, pumps, etc. can be part of a fixed installation, or they can be mounted on a movable cart or vehicle that is moved to or travels to a given valve set 200, for connection, delivery, rinsing, de-connection, and then repeating for the next valve set 200.

FIG. 5 is a cross-sectional view of the valve set 200 and the spray system 300 for agricultural spraying of FIG. 4 with the top valves 120 in the second state and the bottom valves 140 in the third state and showing a valve set installation 400 and an agricultural field 420 including agricultural plants 410 thereon. The agricultural plants 410 may be trees in an orchard, vines in a vineyard, etc. The discharge outlets 146 (e.g., the discharge nozzles 170 attached thereto) are positioned proximal to the agricultural plants 410 (e.g., above the canopies thereof) such that spray liquid discharged via the discharge outlets 146 contacts the agricultural plants 410 (e.g., the canopies thereof).

Referring to both FIGS. 4 and 5 and initially to FIG. 4, in operation and to dispense the liquid agrochemical formulation onto the agricultural plants 410, a liquid agrochemical formulation charging process can be performed with the top valves 120 all in the first state and the bottom valves 140 all in the second state. The charging process includes filling the internal volume of all spray tubes 210 and all fluid conduits 160 in the valve set 200 with the liquid agrochemical formulation (e.g., from the supply source 320 or reservoir thereof with the associated pump). The charging process may also evacuate air from the spray tubes 210 and fluid conduits 160, being expelled into the air line in the top valves and vented.

Referring now to FIG. 5, a liquid agrochemical formulation discharging process can then be performed with the top valves 120 all in the second state and the bottom valves 140 all in the third state. The charging process may include pressurizing the air tubes 220 and the top valves 120 (e.g., gaseous internal portions thereof via the air inlets 122/air outlets 124) with the compressed air source 310 to a pressure sufficient (i) to transition the top valves 120 from the first state to the second state (e.g., about 2-4 bar, preferably with a gradual low-pressure priming pre-step of increasing the pressure but without changing the top valve state) and (ii) to transition the bottom valves 140 from the second state to the third state (e.g., due to pressure in the upstream top valve 120 exerted via the supply line), thereby discharging the liquid agrochemical formulation from each fluid conduit 160 and supply tube via the discharge outlet 146 and onto the agricultural plants 410.

Continuing to refer to both FIGS. 4 and 5 and initially to FIG. 4, in operation and to dispense the rinse liquid onto the agricultural plants 410, a rinse liquid charging process can be performed with the top valves 120 all in the first state and the bottom valves 140 all in the second state. The charging process may include filling the internal volume of all spray tubes 210 and all fluid conduits 160 in the valve set 200 with the rinse liquid (e.g., from the supply source 330 or reservoir thereof with the associated pump).

Referring now to FIG. 5, a rinse liquid discharging process can then be performed with the top valves 120 all in the second state and the bottom valves 140 all in the third state. The charging process may include pressurizing the air tubes 220 and the top valves 120 with the compressed air source 310 to a pressure sufficient (i) to transition the top valves 120 from the first state to the second state and (ii) to transition the bottom valves 140 from the second state to the third state, thereby discharging the rinse liquid from each fluid conduit 160 and supply tube via the discharge outlet 146 and onto the agricultural plants 410.

To drain the valve set 200, the valve set 200 can be opened to the atmosphere (e.g., the air line 138 and associate air tubes, the liquid line 139 and associated supply tubes and the fluid conduits 160), thereby: (i) maintaining the top valves 120 to the second state, (ii) transitioning the bottom valves 140 to the first state with the reed valve 156 in the open position, and (iii) allowing any liquid in the valve set 200 to drain and exit the valve set 200 via the drain outlets 148.

FIG. 6 is an expanded view of a valve assembly 100 that be used to the implement the valve assembly 100 of FIG. 1 including the top valve 120, the bottom valve 140, and the fluid conduit 160. In the implementation shown, the top valve 120 includes the top valve body 121, the air inlet 122, the air outlet 124, the top liquid inlet 126, the top liquid outlet 128, and the buoyant float 132 and the fasteners 506 that are received within apertures 508 to secure the air inlet 122, the air outlet 124, and the top liquid inlet 126 to the top valve body 121. The top valve 120 also includes seals 510 that are positioned around the corresponding the air inlet 122, the air outlet 124, the top liquid inlet 126, and/or within the corresponding ports 512, 514, 516, 518 of the top valve body 121. As shown, the ports 512, 514, 516, 518 receive at least portion of the air inlet 122, the air outlet 124, the top liquid inlet 126, the top liquid outlet 128, and the buoyant float 132 when the top valve 120 is assembled. The top valve 120 also includes a threaded cap 520 that may include the top liquid outlet 128 and that threads into the port 518 of the top valve body 121 to secure the buoyant float 132 within the top valve body 121.

Still referring to FIG. 6, in the implementation shown, the bottom valve 140 includes the bottom valve body 141 and the bottom liquid inlet 142, the bottom liquid outlet 144, the discharge outlet 146, the drain outlet 148, the piston 152, the reed valve 156, and the exit orifice 158. The bottom valve 140 also includes the fasteners 506 that are received within the apertures 508 to couple the bottom liquid outlet 144 to the bottom valve body 141. The bottom valve 140 also includes a plurality of ports 522, 524, 526 that receive the seals 510 and/or the fluid conduit 160, the air outlet 124 and/or a threaded cap 528 when the bottom valve 140 is assembled.

FIG. 7 is a partial cross-sectional view of the valve assembly 100 of FIG. 6 showing the top valve 120 and the fluid conduit 160. In the implementation shown, the air inlet 122, the air outlet 124, the top liquid inlet 126, and the top liquid outlet 128 are positioned and secured within the corresponding ports 512, 514, 516 of the top valve body 121 by the fasteners 506, the fluid conduit 160 is threaded into the threaded cap 520 of the top valve body 121, and the threaded cap 520 is threaded into the port 518. As shown, the ports 512, 514 are coaxial, a longitudinal axis 530 of the top interior chamber 130 is substantially perpendicular to the ports 512, 514 the port 516 is between about 20° and about 30° relative to the longitudinal axis 530, and the port 518 and the top interior chamber 130 are coaxial.

FIG. 8 is a partial cross-sectional view of the valve assembly 100 of FIG. 6 showing the bottom valve 140 and the fluid conduit 160. In the implementation shown, the bottom liquid outlet 144 is positioned and secured within the port 524 of the bottom valve body 141, the fluid conduit 160 is threaded into the port 528 of the bottom valve body 141, and the threaded cap 528 is threaded into the port 528. As shown, the ports 522, 528 are coaxial and the port 524 is between about 60° and about 80° relative to the longitudinal axis 530.

Further, while several examples have been disclosed herein, any features from any examples may be combined with or replaced by other features from other examples. Moreover, while several examples have been disclosed herein, changes may be made to the disclosed examples without departing from the scope of the claims.

LIST OF COMPONENTS

100 valve assembly
120 top valve (first, second state)
121 top valve body
122 air inlet
124 air outlet
126 top liquid inlet
128 top liquid outlet
130 top interior chamber
132 buoyant float
134 valve seat
136 valve seat
137 arrow or vertical direction
138 air line
139 liquid line
140 bottom valve (first, second, third state)
141 bottom valve body
142 bottom liquid inlet
144 bottom liquid outlet
146 discharge outlet
148 drain outlet
150 bottom interior chamber
152 piston
154 piston spring
156 reed valve
158 exit orifice
159 opposing wall
160 fluid conduit
162 top (piston) surface
170 discharge nozzle
200 valve set
210 spray tube
220 air tube
230 plug
300 spray system
310 compressed air source
320 liquid agrochemical formulation source
330 rinse liquid source
400 valve set installation
410 agricultural plants
420 agricultural field
500 orifice
502 air system
504 liquid system
505 orifice
506 fastener
508 apertures
510 seals
512 port
514 port
516 port
518 port
520 threaded cap
522 port
524 port
526 port
528 threaded cap
530 longitudinal axis

What is claimed is:

1. A valve assembly for agricultural spraying, the valve assembly comprising:

a top valve comprising: an air inlet, an air outlet, a top liquid inlet, and a top liquid outlet, wherein the top valve provides fluid communication therethrough in at least two states such that:

(1) in a first state of the top valve, the air inlet is in fluid communication with the air outlet, and the top liquid inlet is in fluid communication with the top liquid outlet; and (2) in a second state of the top valve, the air inlet, the air outlet, and the top liquid inlet are in fluid communication with each other;

a bottom valve comprising: a bottom liquid inlet, a bottom liquid outlet, a discharge outlet, and a drain outlet, wherein the bottom valve provides fluid communication therethrough in at least three states such that:

(1) in a first state of the bottom valve, the bottom liquid inlet, the bottom liquid outlet, and the drain outlet are in fluid communication with each other;

(2) in a second state of the bottom valve, the bottom liquid inlet is in fluid communication with the bottom liquid outlet; and (3) in a third state of the bottom valve, the bottom liquid inlet, the bottom liquid outlet, and the discharge outlet are in fluid communication with each other; and a fluid conduit in fluid communication with the top liquid outlet and the bottom liquid inlet, wherein the top valve and the bottom valve are in fluid communication via the fluid conduit;

wherein:

when the top valve is in the first state, the bottom valve is in the second state.

2. The valve assembly of claim 1, wherein:

the top valve defines a top interior chamber in fluid communication with the air inlet, the air outlet, the top liquid inlet, and the top liquid outlet;

the top valve further comprises a buoyant float slidably engaged within the top interior chamber;

buoyant forces from liquid filling the valve assembly slide the buoyant float into a upper position such that the top valve is in the first state; and air pressure forces from air pressurizing the valve assembly via the air inlet counteract any buoyant forces and slide the buoyant float into a lower position such that the top valve is in the second state.

3. The valve assembly of claim 2, wherein:

the bottom valve defines a bottom interior chamber in fluid communication with the bottom liquid inlet, the bottom liquid outlet, the discharge outlet, and the drain outlet;

the bottom valve further comprises:

a piston slidably engaged within the bottom interior chamber, the piston defining an exit orifice in fluid communication with the drain outlet;

a piston spring compressively engaged with the piston; and a reed valve positioned over the exit orifice of the piston;

in the absence of applied pressure, the reed valve is open and the piston is in an upper position preventing outflow via the discharge outlet such that the bottom valve is in the first state;

under a low applied pressure, the reed valve is closed and the piston is in an upper position preventing outflow via the discharge outlet such that the bottom valve is in the second state; and under a high applied pressure, the reed valve is closed and the piston is in a lower position allowing outflow via the discharge outlet such that the bottom valve is in the third state.

4. The valve assembly of claim 3, wherein the top interior chamber and the bottom interior chamber are free from pooling zones in which liquid can accumulate after drainage of the valve assembly.

5. The valve assembly of claim 1, further comprising:

a discharge nozzle in fluid communication with the discharge outlet of the bottom valve.

6. The valve assembly of claim 1, wherein the fluid conduit has a hydraulic diameter of at least 10 mm.

7. The valve assembly of claim 1, wherein at least one of the air inlet, the air outlet, the top liquid inlet, the top liquid outlet, the bottom liquid inlet, and the bottom liquid outlet comprise a rotatable connection for a fluid flow line.

8. A valve set for agricultural spraying, the valve set comprising:

a plurality of n valve assemblies in series, each valve assembly according to claim 1, wherein n is at least 2;

a plurality of n−1 spray tubes, each spray tube being in fluid communication with an upstream bottom liquid outlet and a downstream top liquid inlet, wherein an upstream valve assembly of the valve assemblies and a downstream valve assembly of the valve assemblies are in fluid communication via the spray tube;

a plurality of n−1 air tubes, each air tube being in fluid communication with an upstream air outlet and a downstream air inlet, wherein the upstream valve assembly and the downstream valve assembly are in fluid communication via the air tube;

an initial bottom valve;

an initial spray tube in fluid communication with a bottom liquid outlet of the initial bottom valve and the top liquid inlet of a first valve assembly of the valve assemblies, wherein the initial bottom valve and the first valve assembly are in fluid communication via the initial spray tube;

a final top valve; and a final spray tube in fluid communication with a bottom liquid outlet of the nth valve assembly and the top liquid inlet of the final top valve, wherein a final valve assembly of the valve assemblies and the final top valve are in fluid communication via the final spray tube; wherein: when the top valves are each in the second state, the bottom valves are each in the third state.

9. The valve set of claim 8, wherein the initial bottom valve comprises a bottom liquid inlet, a bottom liquid outlet, a discharge outlet, and a drain outlet.

10. The valve set of claim 9, wherein the bottom valve of each valve assembly and the initial bottom valve defines a bottom interior chamber in fluid communication with the bottom liquid inlet, the bottom liquid outlet, the discharge outlet, and the drain outlet, and wherein the bottom valve of each valve assembly and the initial bottom valve further comprise:

a piston slidably engaged within the bottom interior chamber, the piston defining an exit orifice in fluid communication with the drain outlet;

a piston spring compressively engaged with the piston; and a reed valve positioned over the exit orifice of the piston;

in the absence of applied pressure, the reed valve is open and the piston is in an upper position preventing outflow via the discharge outlet such that the bottom valve is in the first state;

under a low applied pressure, the reed valve is closed and the piston is in an upper position preventing outflow via the discharge outlet such that the bottom valve is in the second state; and under a high applied pressure, the reed valve is closed and the piston is in a lower position allowing outflow via the discharge outlet such that the bottom valve is in the third state.

11. The valve set of claim 8, further comprising a plug and wherein the final top valve comprises an air inlet, an air outlet, a top liquid inlet, and a top liquid outlet, the plug being disposed within the top liquid outlet of the final top valve.

12. The valve set of claim 11, wherein the top valve of each valve assembly and the final top valve defines a top interior chamber in fluid communication with the air inlet, the air outlet, the top liquid inlet, and the top liquid outlet and the top valve further comprises a buoyant float slidably engaged within the top interior chamber.

13. The valve set of claim 12, further comprising:

a discharge nozzle in fluid communication with the discharge outlet of each bottom valve.

14. The valve set of claim 13, wherein:

each discharge nozzle has a corresponding coverage area of spray liquid dispensed from the discharge nozzle;

a ratio of (i) the collective internal volume of all spray tubes and all fluid conduits in the valve set to (ii) the collective coverage area of all discharge nozzles in the valve set is in a range of about 375 liter/hectare to about 935 liter/hectare.

15. The valve set of claim 14, wherein the spray tubes and the air tubes are formed from a flexible plastic or rubber material.

16. A valve set installation for agricultural spraying, the installation comprising:
a valve set according to claim 8 mounted in an agricultural field
comprising agricultural plants thereon;
wherein the discharge outlets are positioned proximal to the agricultural plants such that spray liquid discharged via the discharge outlets contacts the agricultural plants.

17. The valve set of claim 8, wherein the upstream valve assembly comprises the first valve assembly, and the downstream valve assembly comprises the final valve assembly.

18. A spray system for agricultural spraying, the system comprising:
a valve set according to claim 8;
a compressed air source in fluid communication with an air inlet or an air outlet;
a liquid agrochemical formulation source in fluid communication with the bottom liquid inlet of the initial bottom valve; and
a rinse liquid source in fluid communication with the bottom liquid inlet of the initial bottom valve.

19. The spray system of claim 18, wherein the liquid agrochemical formulation comprises one or more of a pesticide, a plant growth regulator, and a foliar nutrient in a water medium.

20. A method for applying a liquid agrochemical formulation to agricultural plants, the method comprising:
providing the spray system of claim 18, wherein:
the valve set is positioned in an agricultural field comprising agricultural plants thereon, and
the discharge outlets are positioned proximal to the agricultural plants such that spray liquid discharged via the discharge outlets contacts the agricultural plants;
performing a liquid agrochemical formulation charging process with the top valves all in the first state and the bottom valves all in the second state, the charging process comprising:

filling the internal volume of all spray tubes and all fluid conduits in the valve set with the liquid agrochemical formulation; and
performing a liquid agrochemical formulation discharging process with the top valves all in the second state and the bottom valves all in the third state, the charging process comprising:
pressurizing the air tubes and the top valves with the compressed air source to a pressure sufficient (i) to transition the top valves from the first state to the second state and (ii) to transition the bottom valves from the second state to the third state, thereby discharging the liquid agrochemical formulation from each fluid conduit and supply tube via the discharge outlet and onto the agricultural plants.

21. The method of claim 20, further comprising:
performing a rinse liquid charging process with the top valves all in the first state and the bottom valves all in the second state, the charging process comprising:
filling the internal volume of all spray tubes and all fluid conduits in the valve set with the rinse liquid; and
performing a rinse liquid discharging process with the top valves all in the second state and the bottom valves all in the third state, the charging process comprising:
pressurizing the air tubes and the top valves with the compressed air source to a pressure sufficient (i) to transition the top valves from the first state to the second state and (ii) to transition the bottom valves from the second state to the third state, thereby discharging the rinse liquid from each fluid conduit and supply tube via the discharge outlet and onto the agricultural plants.

22. The method of claim 20, further comprising:
opening the valve set to the atmosphere, thereby: (i) maintaining the top valves to the second state, (ii) transitioning the bottom valves to the first state, and (iii) allowing any liquid in the valve set to drain and exit the valve set via the drain outlets.

* * * * *